US011533628B2

(12) United States Patent
Jayawickrama et al.

(10) Patent No.: US 11,533,628 B2
(45) Date of Patent: Dec. 20, 2022

(54) ALLOCATING WIRELESS CHANNELS

(71) Applicant: Intel Corporation, Santa Clara, CA (US)

(72) Inventors: Beeshanga Jayawickrama, Sydney (AU); Ying He, Sydney (AU); Markus Dominik Mueck, Unterhaching (DE); Biljana Badic, Munich (DE); Killian Roth, Munich (DE); Srikathyayani Srikanteswara, Portland, OR (US); Zhibin Yu, Unterhaching (DE); Eryk Dutkiewicz, Sydney (AU)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 16/498,718

(22) PCT Filed: Jan. 22, 2018

(86) PCT No.: PCT/US2018/014679
§ 371 (c)(1),
(2) Date: Sep. 27, 2019

(87) PCT Pub. No.: WO2018/182832
PCT Pub. Date: Oct. 4, 2018

(65) Prior Publication Data
US 2021/0360416 A1  Nov. 18, 2021

Related U.S. Application Data

(63) Continuation of application No. 15/474,606, filed on Mar. 30, 2017, now Pat. No. 10,187,804.

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0453* (2013.01); *H04W 72/085* (2013.01); *H04W 72/10* (2013.01); *H04W 88/02* (2013.01)

(58) Field of Classification Search
CPC ........... H04W 28/0252; H04W 72/082; H04W 72/0486; H04W 16/14; H04W 72/048;
(Continued)

(56) References Cited

U.S. PATENT DOCUMENTS 10,187,804 B2    1/2019  Jayawickrama et al.
2005/0169354 A1*  8/2005  Olson .................. H04B 1/7107
                                                         375/148
(Continued)

FOREIGN PATENT DOCUMENTS

WO   2007031959 A3    6/2007
WO   2008153553 A1   12/2008
WO   2010138289 A1   12/2010

OTHER PUBLICATIONS

International Search Report dated Apr. 6, 2018, for International Application No. PCT/US2018/014679.
(Continued)

*Primary Examiner* — Jung Liu
(74) *Attorney, Agent, or Firm* — Banner & Witcoff Ltd.

(57) ABSTRACT

An apparatus and a method for allocating wireless channels are disclosed. For example, the method, by an aggregator, aggregates sensed information received from a plurality of sensing devices, by an analyzer, analyzes the sensed information that is aggregated and determines when an incumbent is not detected based on the analysis, and allocates, by a channel allocator, a wireless channel of the targeted frequency spectrum to a user equipment when the incumbent is not detected.

17 Claims, 5 Drawing Sheets

(51) Int. Cl.
*H04W 72/08* (2009.01)
*H04W 72/10* (2009.01)
*H04W 88/02* (2009.01)

(58) Field of Classification Search
CPC ............... H04W 52/243; H04W 16/10; H04W 24/10; H04W 72/0453; H04W 72/00; H04W 72/085; H04W 72/10; H04W 88/02; H04L 5/0032; H04B 1/0067
See application file for complete search history.

(56) References Cited

U.S. PATENT DOCUMENTS

| | | | |
|---|---|---|---|
| 2008/0165754 A1* | 7/2008 | Hu ..................... | H04W 72/085 370/342 |
| 2010/0303026 A1* | 12/2010 | Chaudhri .............. | H04W 16/14 370/329 |
| 2012/0294168 A1* | 11/2012 | Freda ................... | H04B 1/0067 370/252 |
| 2017/0295578 A1* | 10/2017 | Khoshnevisan .. | H04W 28/0252 |
| 2021/0392507 A1* | 12/2021 | Macmullan ........... | H04W 24/02 |

OTHER PUBLICATIONS

International Preliminary Report on Patentability dated Oct. 10, 2019, and Written Opinion of the International Searching Authority dated Apr. 6, 2018, for International Application No. PCT/US2018/014679.

* cited by examiner

ALLOCATING WIRELESS CHANNELS

The present application is a national stage application filed under 35 U.S.C. 371 based on PCT International Application No. PCT/US2018/014679, filed Jan. 22, 2018, which claims the benefit of priority of and to U.S. patent application Ser. No. 15/474,606, filed Mar. 30, 2017, each of which is incorporated herein by reference in its entirety.

The present disclosure describes a method and an apparatus for allocating wireless channels of a frequency spectrum. For example, the method may be for enabling sharing of channels of a frequency spectrum in the 3.5 GHz band. Although, the present disclosure is described below for channels of a frequency spectrum in a 3.5 GHz (Gigahertz) band, the allocation of channels may be for any shared frequency band.

BACKGROUND

As more and more users have become reliant on wireless user endpoint devices for accessing a variety of communications services, spectrum resources have become invaluable to the service providers. However, spectrum resources are limited and sharing spectrum resources may be beneficial.

BRIEF DESCRIPTION OF THE DRAWINGS

The teaching of the present disclosure can be more fully understood by reading the subsequent detailed description and examples in conjunction with references made to the accompanying drawings, in which.

To facilitate reading, identical reference numbers are used to designate elements that are common to various figures, where possible

DETAILED DESCRIPTION

Figure 1:
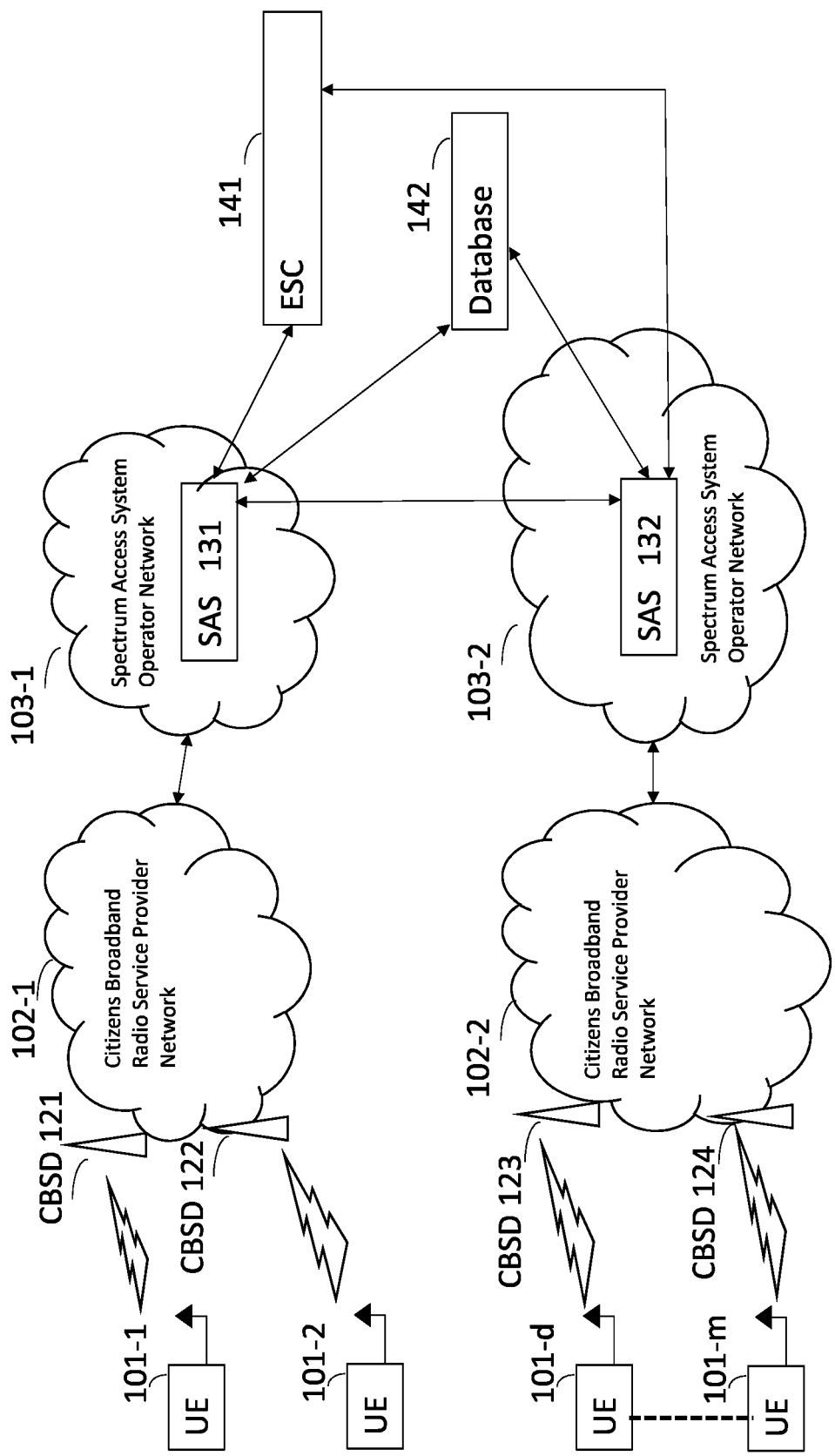
FIG. 1 illustrates a network that uses an environmental sensing capability for allocating channels to wireless devices.

The present disclosure relates to an apparatus and a method for allocating wireless channels of a targeted frequency spectrum. For example, the teaching of the present disclosure may be for sharing a frequency spectrum among incumbent users, and users of services provided by Priority Access (PA) and General Authorized Access (GAA) licensees. For example, 5G and LTE network service providers may wish to enable their subscribers to access services via a channel of the targeted frequency spectrum.

It is noted that the various users, e.g., incumbents, PA licensees and GAA licensees and the respective applicable rules for operating in the 3.5 GHz band, are described below. Although, the rules described below are for the 3.5 GHz band, those ordinarily skilled in the present art realize that the sharing of channels may be for any frequency band. As such, users may be assigned to different priority levels, with the highest priority being similar to the incumbent, and so on.

As described above, the popularity of wireless services continues to grow. The radio links that support wireless services may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11 ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

In order to assure spectrum is allocated to various service providers appropriately, the allocation may be regulated by a government agency. For example, in the United States (U.S.), the Federal Communications Commission (FCC) regulates usage of frequency spectrum. In another example, in Europe, Conference Européenne des administrations des Postes et des Télécommunications (CEPT) and European Telecommunications Standards Institute (ETSI) regulate usage of frequency spectrum.

The frequency band below 6 GHz is allocated for use in many geographical areas around the world. For example, in the U.S., the frequency band below 6 GHz is allocated to incumbents. The incumbents of the 3.5 GHz band may include operators of fixed satellites and agencies of the U.S. Federal government, e.g., radar systems of the Department of Defense (DoD), and the like. However, the FCC or another similar agency that is tasked with regulating the usage of frequency spectrum may allow other service providers to share the frequency spectrum with the incumbent. When the sharing is allowed, it is subject to various constraints. For example, for the U.S. and U.S. territories, the FCC released a Report and Order outlining the rules for operating wireless devices in the 3.5 GHz band that spans from 3550-3700 MHz. (See e.g., *Report and Order and Second Further Notice of Proposed Rulemaking*, Adopted: Apr. 17, 2105, Released: Apr. 21, 2015, FCC 15-47).

It is noted that the description below provided for the 3.5 GHz band is exemplary and not intended to limit the implementation to that band. That is, the method of the present disclosure may be used in the context of any spectrum management scheme including schemes for dedicated licensed spectrum, unlicensed spectrum, (licensed) shared spectrum, and so on. In one example, the licensed shared spectrum may be for e.g., for a Licensed Shared Access (LSA) in 2.3-2.4 GHz band, 3.4-3.6 GHz band, 3.6-3.8 GHz Band, etc. In another example, the licensed shared access may be for e.g., for a Spectrum Access System (SAS) in 3.55-3.7 GHz band, etc.

Moreover, it is noted that the applicable spectrum bands may include:
International Mobile Telecommunications (IMT) spectrum (including bands of 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.) It is noted that some IMT bands are limited to specific region(s) and/or countries),
IMT-advanced spectrum,
IMT-2020 spectrum (which are expected to include 3400-3800 MHz, 3.5 GHz bands, 700 MHz bands, bands within the 24.25-86 GHz range, etc.),
Spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc),
The ITS (Intelligent Transport Systems) band of 5.9 GHz (which is typically 5.85-5.925 GHz) and 63-64 GHz,
Bands currently allocated to automotive radar applications such as 76-81 GHz, and
Future bands including 94-300 GHz, and above.

Furthermore, the scheme can be used on a secondary basis on bands such as the TV White Space bands (which are typically below 790 MHz).

Furthermore, the sharing of frequency spectrum may be for applications other than cellular application. In addition to cellular applications, sharing of frequency bands for other markets (applications) may be performed. For example, the applications may be related to Program Making and Special Events (PMSE), medical, health, surgery, automotive, low-latency, drones, etc.

Note furthermore that a hierarchical application of the scheme is possible for any of the above, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Note Furthermore that the scheme may be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

The Report and Order enables sharing of channels within the 3.5 GHz band and provides the rules for operating in that band. The Report and Order divides the various types of users into three tiers: Tier 1, Tier 2 and Tier 3. Tier 1 is for the incumbents. As described above, the incumbents of the 3.5 GHz band may include operators of fixed satellites and agencies of the U.S. Federal government, e.g., radar systems of the Department of Defense (DoD), and the like. Tier 2 is for Priority Access (PA). For example, mobile service providers may provide location based services and boost coverage areas. Tier 3 is for a General Authorized Access (GAA). For example, amateur radio operators may use the spectrum when the spectrum is not being used by an incumbent or PAL.

The incumbents get the highest priority in the 3.5 GHz band. A spectrum in this band can be used by a Tier 2 or a Tier 3 operator only when and where the incumbent is not using the spectrum. The users that hold Priority Access Licenses (PALs) have priority over users in Tier 3 holding GAA licenses. The usage of the spectrum by Tier 3 licensees is similar to the usage of an unlicensed spectrum. Thus, when the incumbent is not using the spectrum, wireless devices may use a spectrum as a PA or GAA licensee for any number of broadband services.

The rules for operating in the 3.5 GHz band also mandate that the spectrum usage be coordinated. The coordination of spectrum usage among the incumbents, PAL and GAA licensees is performed by a Spectrum Access System (SAS). The SAS serves as a central controller for this band and is deployed upon approval by the regulatory agency, e.g., by the FCC. Most of the information to be contained in the SAS is specified by the FCC. In addition, if multiple SASs are being used, the FCC's Report and Order mandates that the information contained in the multiple SASs be synchronized.

A device such as a communication device or a base station that is a Tier 2 device or a Tier 3 device may be permitted to operate in the 3.5 GHz band when it is in a constant communication with the SAS and is receiving information on when and where the device may operate within the 3.5 GHz band. Since the SAS coordinates the spectrum usage among the incumbents, PALs and GAA licensees, the SAS has information about the network and devices.

The FCC also requires that information on incumbent services be reliably protected while maintaining interference from other systems (e.g., Tier 2 and/or Tier 3 systems). For example, the information on the incumbent service may be information related to a movement of a naval vessel. The FCC strictly prohibits information on movement of naval vessels from being available to commercial $3^{rd}$ parties. Thus, information on movement of naval vessels must be protected while preventing Tier 2 and Tier 3 devices from interfering with a military naval radar system.

One approach to allow the sharing while satisfying the above rules is using a network that includes an SAS with an Environmental Sensing Capability (ESC). The ESC is managed by an independent dedicated third party entity and is used for detecting a presence of an incumbent within the 3550-3700 MHz (Megahertz) band. The ESC is independent of the SAS because of the need for complying with stringent privacy requirements in regards to information about the incumbent. For example, the ESC is required not to determine a location and/or movement of a radar system of an incumbent. In addition, the ESC is required not to store measurement data or keep any form of historical data. Hence, the ESC may make a decision on an absence or presence of an incumbent based only on current measurement data. Once the decision is made, the measurement data is discarded. Although this approach meets the requirements of the FCC, having a dedicated network of ESCs is costly.

FIG. 1 illustrates a network 100 that uses an environmental sensing capability for allocating channels to wireless devices. The network 100 comprises wireless User Equipment (UE) 101-1, 101-2, . . . , 101-*m*, citizens broadband radio service provider networks 102-1 and 102-2, Spectrum Access System (SAS) operator networks 103-1 and 103-2, an ESC 141 and a database 142.

The citizens broadband radio service provider networks 102-1 and 102-2 comprise fixed stations 121-122 and 123-124, respectively. The fixed stations 121-124 may be referred to as Citizens Broadband Service Devices (CBSDs).

As described above, the ESC 141 is an independent entity for detecting a presence of an incumbent. The database 142 is for storing information related to commercial users.

The SAS operator networks 103-1 and 103-2 comprise SASs 131 and 132, respectively. The SASs 131 and 132 are communicatively coupled to ESC 141 and to the database 142. In addition, in order to coordinate usage of channels, the SASs 131 and 132 are communicatively coupled to each other.

The UEs 101-1, 101-2, . . . , 101-*m* communicate with an SAS 131 or SAS 132 via a CBSD of a network of a citizens broadband radio service provider. For the example of FIG. 1, UE 101-1 communicates with SAS 131 via the CBSD 121, UE 101-2 communicates with SAS 131 via the CBSD 122, UE 101-*d* communicates with SAS 132 via the CBSD 123, and UE 101-*m* communicates with SAS 132 via the CBSD 124.

In operation, the SASs 131 and 132 determine whether the incumbent is present from the ESC 141. Then, the SASs are used for allocating channels to Tier 2 and Tier 3 licensees when the incumbent is not detected by the ESC 141. As noted above, the UEs may use the allocated channel only when they are in constant communication with an SAS.

It is noted that although the description above was for networks that use the SAS, the method may be applied via any other controller that allocates spectrum resources. In other words, controllers for other regions have similar standards and tier based approach for providing a spectrum resource. For example, for Europe, the Licensed Shared Access (LSA) enables sharing between incumbents (Tier-1 users) and licensees (Tier-2 users). The European approach does not include a GAA type user and is initially defined for the 2.3-2.4 GHz band. However, the usage may be extended to another band. The LSA system includes an LSA repository and an LSA controller. The LSA repository is for storing intended spectrum usage by an incumbent. The LSA controller is a decision making entity that decides on actual usage of spectrum based on data stored in the LSA Repository. The method of the present disclosure may readily be implemented via the LSA controller in a similar manner.

Returning to FIG. 1, the network 100, described above, requires an ESC, e.g., ESC 141, for operation and compliance with FCC rules. In addition, each SAS has to maintain a constant communication with the ESC to ensure that knowledge about a detection of an incumbent is received from the ESC in a timely manner. The constant communication is needed to prevent Tier 2 and Tier 3 users from affecting the signals of the incumbent. The need to maintain the ESC and the need for constant communication between the ESC and all SASs make networks that necessitate an ESC costly.

The present disclosure provides a method and an apparatus for allocating channels of a frequency spectrum, e.g., channels in the 3.5 GHz band, without an ESC. The method uses commercially available devices for performing measurements, e.g., for measurements of energy levels. The channel allocation is performed without compromising the privacy of the incumbent. As such, the method of the present disclosure is in compliance with the FCC rules. The sensing of energy by a device of the present disclosure is performed such that the SAS that receives sensed information from numerous sensing devices has adequate measurement data to aggregate and make a reliable decision as to a presence of an incumbent, while measurement data available to an individual sensing device or a CBSD is inadequate for making a reliable decision.

Figure 2:
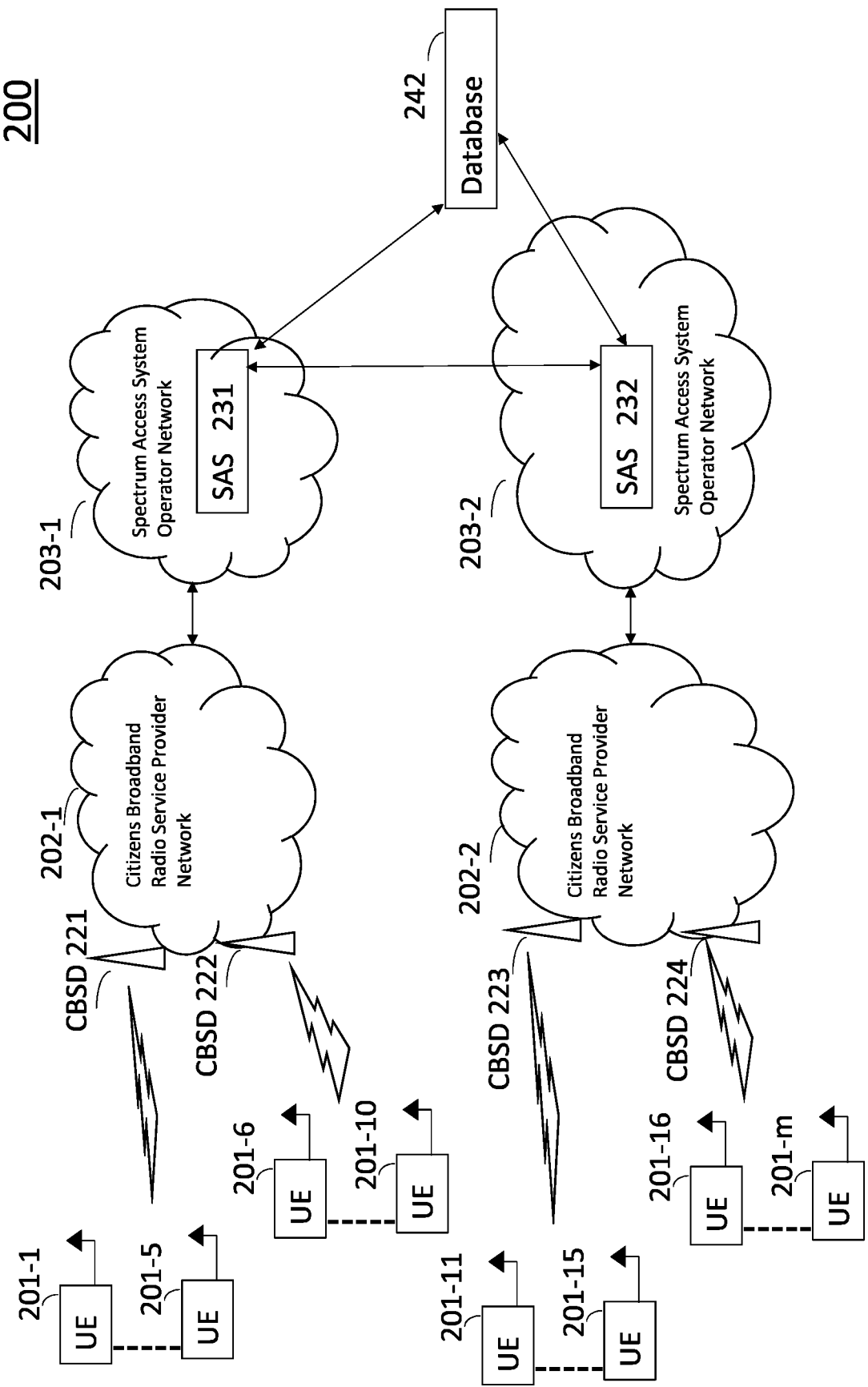
FIG. 2 illustrates a network that allocates channels to wireless devices in accordance with the teachings of the present disclosure.

FIG. 2 illustrates a network 200 that allocates channels to wireless devices in accordance with exemplary aspects of the present disclosure. The network 200 performs the allocating of channels without an ESC.

In an exemplary aspects, the network 200 comprises UEs 201-1, 201-2, . . . , 201-*m*, citizens broadband radio service provider networks 202-1 and 202-2, SAS operator networks 203-1 and 203-2, and a database 242. The citizens broadband radio service provider networks 202-1 and 202-2 comprise fixed stations 221-222 and 223-224, respectively. The database 242 is for storing information related to commercial users. The SAS operator networks 203-1 and 203-2 comprise SASs 231 and 232, respectively. The SASs 231 and 232 are communicatively coupled to the database 242 and to each other. In an exemplary aspect, the SASs 231, 232 include processor circuitry that is configured to perform one or more functions and/or operations of the SAS described herein.

The UEs 201-1, 201-2, . . . , 201-*m* communicate with an SAS 231 or SAS 232 via a CBSD. For example, UEs 201-1-201-5 may communicate via CBSD 221, UEs 201-6-201-10 communicate via CBSD 222, UEs 201-11-201-15 may communicate via CBSD 223, and UEs 201-16-201-*m* communicate via CBSD 224. It is noted that the network 200 does not have an ESC. The SAS determines whether an incumbent is present based on sensed information received from sensing devices (e.g., UEs, base stations, etc. that are selected by the SAS from among devices attached to the corresponding CBSD). The SAS then allocates channels when an incumbent is not detected.

Figure 3:
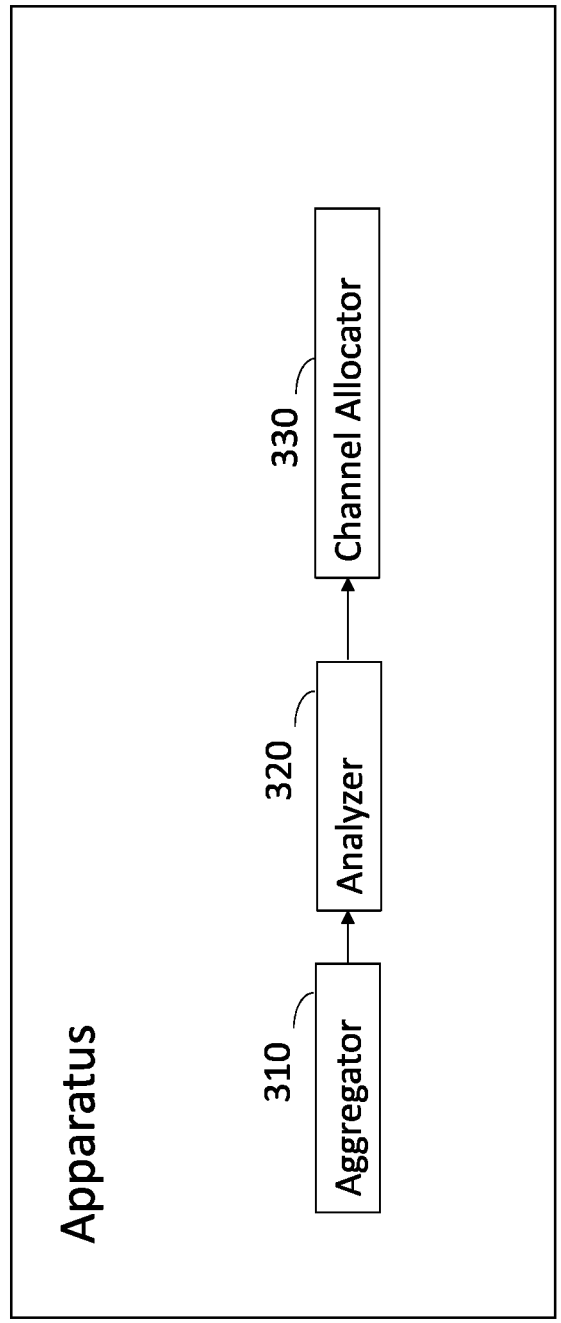
FIG. 3 illustrates an apparatus for allocating wireless channels in accordance with the teachings of the present disclosure.

FIG. 3 illustrates an apparatus 300 for allocating wireless channels in accordance with an exemplary aspect of the present disclosure. In an exemplary aspect, the apparatus 300 is comprised within each of the SASs, e.g., SASs 231 and 232 described above with respect to FIG. 2. In another exemplary aspect, the apparatus 300 is separate from a respective SAS and communicatively coupled to the SAS. In an exemplary aspect, the apparatus 300 comprises an aggregator 310, an analyzer 320 and a channel allocator 330.

The aggregator 310 is configured to aggregate sensed information received from a plurality of sensing devices. In an exemplary aspect, the aggregator 310 includes processor circuitry that is configured to aggregate sensed information received from a plurality of sensing devices.

In one aspect, the SAS is configured to select one or more sensing devices that perform the sensing. For example, the sensing devices may be UEs, base stations, etc. that are selected by the SAS from among devices attached to each CBSD.

In one aspect, the SAS is configured to select, for each CBSD, a pre-determined number of sensing devices from among devices attached to the CBSD. For instance, suppose two UEs are to be selected as sensing devices for each CBSD. Then, SAS 231 may select two UEs from among UEs 101-1-101-5, which are attached to CBSD 221. Similarly, SAS 231 may select two UEs from among UEs 101-6-101-10, which are attached to CBSD 222. Similarly, SAS 232 may select two UEs from among UEs 101-11-101-15, which are attached to CBSD 223, and two UEs from among UEs 101-16-101-$m$, which are attached to CBSD 222. In an exemplary aspect, the SAS can be configured to select a pre-determined number of sensing devices for a subset (i.e., some but not all) of the CBSDs associated with the SAS.

In one aspect, the measurement data is collected from a small sample of sensing devices within a purview of a same CBSD. The number of sensing devices within the purview of a given CBSD is set to a low number to satisfy the criteria that the CBSD cannot make a reliable decision as to an incumbent being present by aggregating data from various sensing devices. Thus, aggregating measurement data and/or decisions within the purview of the same CBSD also leads to an unreliable decision. In other words, the reliability of a decision as to whether an incumbent is present is low at both the CBSD and sensing device levels.

In one aspect, the sensing device comprises a stand-alone device that receives a request for sensed information from an SAS, performs the sensing in response to receiving the request, and provides the sensed information to the SAS. For example, the standalone device may be a trusted node with a sensing capability.

In one aspect, the SAS provides instructions to the sensing devices that are selected. In an exemplary aspect, the instruction sent to a given sensing device comprises values for configuring one or more parameters of the respective sensing device. For example, the instruction may limit a sampling rate of the sensing device. Thus, the SAS not only determines the pre-determined number of sensing devices at a location, e.g., within a purview of a given CBSD, but also selects the plurality of sensing devices that is to perform the sensing. Then, the SAS provides instructions for configuring each selected sensing device. Then, each sensing device that is selected may be configured in accordance with the instruction received from the SAS.

In one aspect, the one or more parameters of a sensing device are configured to perform one of more of: altering a characteristic of a wireless signal by adding noise, including fading of the wireless signal, adding a noise to the decision on a presence or absence of the incumbent, and introducing a limit on the sensing capability of the sensing device to emulate a hardware limitation, etc. For instance, in order to emulate the hardware limitation, the one or more parameters may be configured to sample a sensed signal using a low sampling rate, or to use a low resolution Analog to Digital Convertor (ADC) for digitizing the sensed signal.

In one aspect, the sensed information is received as a response to a request sent to the sensing device by the SAS. For example, the SAS may send, to each selected sensing device, a request for sensed information. In an exemplary aspect, the request comprises at least a targeted frequency spectrum for which an energy level is to be sensed. The SAS is configured to then monitor for detecting when a response to the request is received from a sensing device to which a request for sensed information has been sent. The SAS is configured to then receive the sensed information as a response to the request.

In one aspect, the requests sent to different sensing devices are for performing the sensing at different neighboring bands of the targeted frequency. For example, the SAS may divide the targeted frequency spectrum into a plurality of bands of frequency spectrum. Then, the SAS may send requests to different sensing devices, which each sensing device being instructed to perform the sensing for a different band of the targeted frequency spectrum.

In one aspect, the aggregating, by the aggregator 310, of the sensed information received from the plurality of sensing devices is performed when a threshold for a minimum number of responses is reached. When the number of responses is below the threshold, the SAS may send more requests to either the same or other sensing devices. The sending of requests may be repeated until adequate number of responses are received.

The analyzer 320 is configured to analyze the sensed information that is aggregated, and to determine when an incumbent is not detected based on the analysis. In other words, the analyzer determines whether an incumbent is detected based on an analysis of the sensed information that is aggregated. In an exemplary aspect, the analyzer 320 includes processor circuitry that is configured to analyze the sensed information that is aggregated, and to determine when an incumbent is not detected based on the analysis.

In one aspect, when the incumbent is detected, the SAS identifies the targeted frequency spectrum as unavailable for sharing with other users. When the incumbent is not detected, the SAS identifies the targeted frequency spectrum as available for sharing, e.g., for sharing with Tier 2 and/or Tier 3 licensees.

In one aspect, in order to satisfy the criteria that the decision on whether or not an incumbent is present is unreliable at the sensing device and CBSD levels, the threshold for a decision as to the presence or absence of the incumbent is set to the noise floor level when the incumbent is inactive. For clarity, the noise floor level refers to a level of a measured quantity that is at the same level as would be detected when only a background noise is present. For example, when an energy level that is being sensed is at or below the noise floor level, the energy level is indistinguishable from the background noise and cannot be isolated from the noise.

For instance, suppose the sensing device is a UE and the UE makes a binary decision on whether or not an incumbent is detected. Let, $H_0(0)$=Incumbent radar system is inactive and $H_1(1)$=Incumbent radar system is active. Suppose we consider a channel with an Additive White Gaussian Noise (AWGN) and choose to set the threshold for the decision to the noise floor level. When the incumbent is inactive, the probability of an incumbent being detected based on a single measurement (i.e., a single sensing of energy level) is equal to $0.5\pm\varepsilon$, where $\varepsilon\approx0$. The hypothesis may be represented by: $P\{H_0/H_0\}=0.5$ and $P\{H_1/H_0\}=0.5$. For the measurement data, where the decision is set to the noise floor level, the expectation of the decision is equal to 0.5 when the incumbent is inactive. In other words, when only noise is present, the probability of an incumbent being detected is 0.5.

In contrast, the SAS aggregates measurement data and/or decisions from a sufficiently large number of sensing devices to make the decision at the SAS level more reliable. Regardless of the accuracy levels of the individual measurement data, the mean-values and variances may be computed (e.g., by the analyzer 320) to make a reliable decision at the SAS level. For example, the analysis (e.g., by the analyzer 320) may include determining mean-values and variances and making a decision on the presence or absence of the incumbent based on the mean values and variances. When the incumbent is active, some sensing devices will be able to perceive the burst of energy. Thus, at the SAS level, the present method utilizes a form of crowd-sourcing to achieve an expectation of much greater than 0.5 for detecting an incumbent, when the incumbent is present.

In one aspect, the analysis is performed by the analyzer 320 when the threshold for a minimum number of responses is reached. Recall that the sensing devices are in constant communication with the SAS. Thus, the scenario where no sensed information is received from all of the sensing devices is unlikely. The threshold for the minimum number may be set to ensure that the decision by the SAS is reliable. In one aspect, the SAS operator sets the threshold for the minimum number.

The channel allocator 330 is configured to allocate a wireless channel of a targeted frequency spectrum to a user equipment when the incumbent is not detected. In an exemplary aspect, the channel allocator 330 includes processor circuitry that is configured to allocate a wireless channel of a targeted frequency spectrum to a user equipment when the incumbent is not detected.

In one aspect, the channel allocator 330 is configured to receive requests for allocation of a wireless channel from one or more UEs, identify the UE to which the wireless channel is to be allocated, and allocate the channel to the UE that is identified when the incumbent is not detected by the analyzer 320. The UE that is identified comprises a device from which a request having a highest priority is received.

In one aspect, the SAS determines whether at least one request for an allocation of a channel is received from UEs of Tier 2 or Tier 3 users. For example, the channel allocator may determine when a request for an allocation of a channel is received from Tier 2 and Tier 3 users. When at least one request for the allocation of a channel is received, the SAS allocates the channel of the targeted frequency spectrum to a request having the highest priority. For example, a request from a Tier 2 user has a higher priority than from a Tier 3 user. Similarly, there may be other criteria established for prioritizing within a same Tier. For example, channels may be allocated to Tier 3 users on a first-come-first-served basis. The SAS may then allocate any number of channels of the targeted frequency spectrum in accordance with the criteria.

Returning to the sensed information aggregated by the aggregator 310, in one aspect, the sensed information comprises a first information, where the first information is a decision, by the sensing device, as to a presence or an absence of an incumbent. In one aspect, the decision as to the presence or absence of the incumbent is based at least in part on the energy level that is sensed. In one aspect, the energy level is sensed for the targeted frequency spectrum.

In one aspect, the sensed information available to an individual sensing device or an individual base station is inadequate for making a reliable decision as to detecting the incumbent.

In one aspect, the sensed information comprises measurement data. For example, actual energy levels may be transmitted by the sensing device to the SAS. In one aspect, the sensed information comprises the first information, as described above, and the measurement data.

In one aspect, the measurement data is encrypted by the sensing device prior to being transmitted to the SAS. Any standard protocol for securing communication over an insecure network may be used to achieve a desired security level. For instance, an SSL/TLS protocol may be used. A security context is established during an initial handshake for establishing a connection between the sensing device and the SAS for reporting the measurement data and/or the decision.

In one aspect, the sensed information further comprises second information. In one aspect, the second information is derived based on information known to the SAS. In one aspect, the information on which the second information is derived is unknown to commercial modems and/or base stations.

In one aspect, the second information may be an artificial noise sequence generated by a random sequence generator. The random noise sequence is known to the SAS.

In one aspect, in order to prevent a decision at the sensing device or CBSD level from being reliable, the spectral density of a power associated with the artificial noise sequence is kept higher than a spectral density of a power of the energy level that is sensed by the sensing device.

In one aspect of the present disclosure, the second information may be a pattern known to the SAS. As described above, the pattern is unknown to other devices that may receive the wireless signal transmitted by the sensing device. For example, commercial modems and base stations do not have access to the pattern.

As described above, the second information is based on knowledge known to the SAS. Any standard technique may be applied to combine the first information and the second information.

In one aspect, the first information and the second information may be combined by at least one of: adding the first information and the second information, interleaving the first information and the second information, and mixing the first information with the second information. In one example, a noise sequence known to the SAS may be added to the first information. In another example, a pattern known to the SAS may be interleaved with the first information. In yet another example, random samples may be mixed with the first information. The random sample is generated with full knowledge of the SAS. For instance, the SAS may know the structure and initialization of the random sample generator. As such, the SAS may separate the first information from the second information using its previous knowledge.

In one aspect, the sensed information comprises information about a quality of a link between a sensing device and a CBSD through which the sensing device communicated with the SAS. In one aspect, the information about the quality of the link comprises at least one of: a Packet Error Rate (PER), a Bit Error Rate (BER), a Signal-to-Interference-plus-Noise Ratio (SINR), and out-of-band radiation levels. In one aspect, the sensing device senses the energy level at a low level of resolution, wherein the sensing is for a specific band. For example, a combination of sensing at a low level of resolution and sensing by different sensing devices at different bands of the targeted frequency spectrum may be implemented.

In operation, the SAS receives reports of drops in link quality on all wireless links when an incumbent is present. For instance, suppose there is a cyclic interference from a radar system of an incumbent. Then, the SAS may detect a cyclic decrease in the quality of links. For example, there may be cyclic increases in BERs, PERs, and the like. The sensing device cannot distinguish between a decline in link quality due to interference from a radar system and a decline in link quality due to Doppler frequency shifts (i.e., channel changes of sensing devices). However, the SAS has information on link quality from a large number of sensing devices. Thus, the SAS may make a reliable decision on the presence or absence of an interference from a radar system. As such, the SAS may reliably detect an incumbent by aggregating information on link quality from a large number of sensing devices.

In one aspect, the sensing device senses the energy level at a low level of resolution, wherein a detection of an energy level above a predetermined threshold leads to a maximum detection value. The SAS aggregates the sensed energy levels from a large number of sensing devices, detects a shape of the sensed energy levels, computes a mean value of the sensed energy levels, etc. A decision as to the presence or absence of the incumbent may then be based on the computed mean values, variances, etc. It is noted that the performing the sensing using the low level of resolution is such that the resolution does not enable a decision on the presence or absence of an incumbent to be determined at either the sensing device or the CBSD level. In contrast, the same low level of resolution is such that the decision at the SAS level is reliable.

In one aspect, the SAS controls a level of reliability of the measurements and/or decisions by aligning measurements in the time domain. For example, suppose the communication between the sensing device and the CBSD is in accordance with the LTE protocol and the CBSDs are all synchronized with the SAS. It is noted that the sensing devices are not synchronized among each other. The CBSD knows the time difference between its own clock and the clocks of the sensing devices attached to the CBSD. The CBSD may then provide information to the SAS for aligning measurements in the time domain across the plurality of sensing devices.

In one aspect, for each sensing device, the CBSD through which the sensing device communicates with the SAS may assign a starting time for the measurement from a downlink special sub-frame in accordance with the clock of the sensing device. In addition, the CBSD may provide a duration of time for the measurement. Then, when the CBSD receives the measurement data, the CBSD knows that the measurement of the provided duration of time started at a given time from the special sub-frame, wherein the given time is the summation of the time difference between its own clock and the clock of the sensing device and the assigned starting time for the measurement from the downlink special sub-frame. The CBSD may then provide to the SAS time information as to when measurements were made. The SAS may use the time information to align measurements made by different sensing devices in the time domain.

Figure 4:
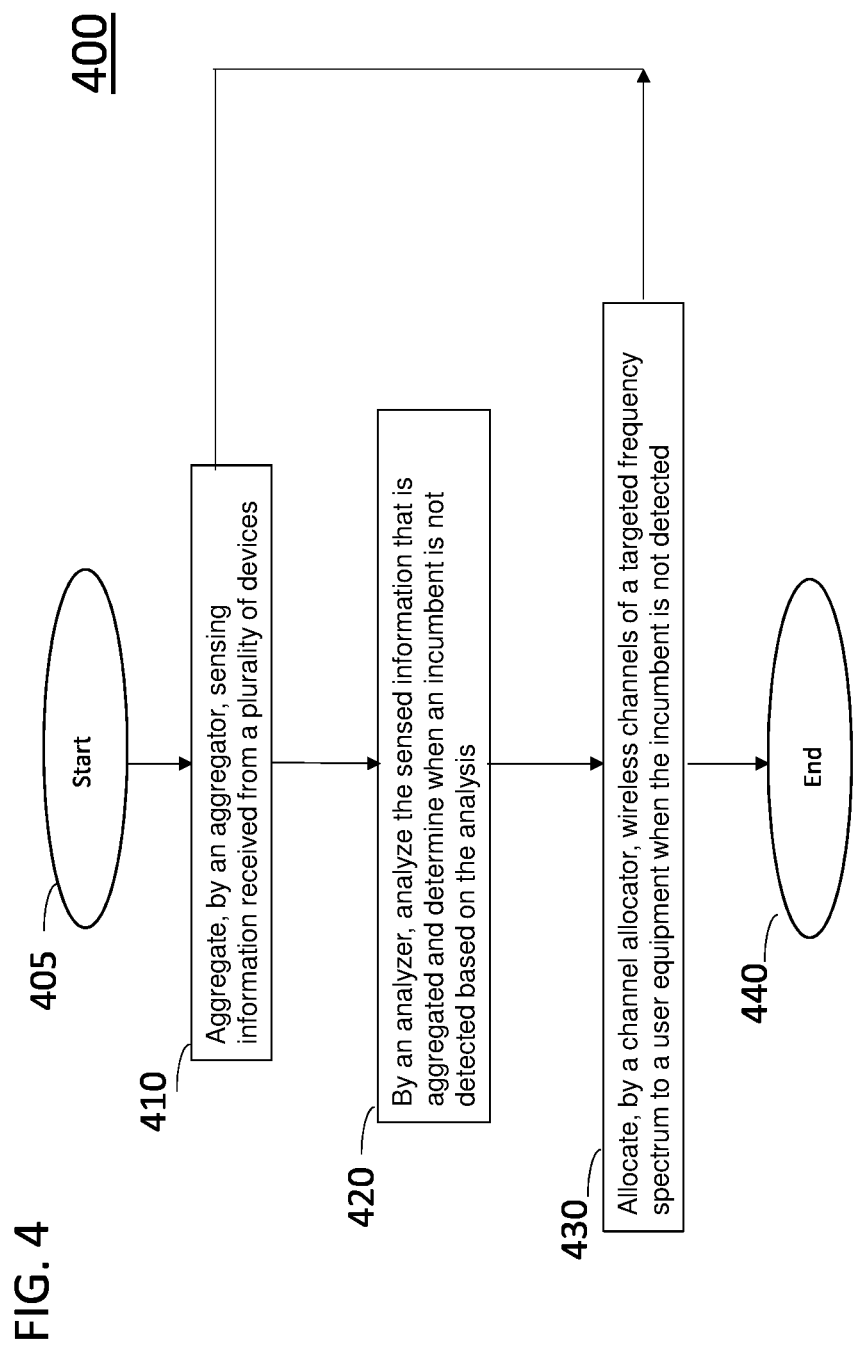
FIG. 4 illustrates a flowchart of a method for allocating wireless channels in accordance with the present disclosure.

FIG. 4 illustrates a flowchart of an example method 400 for allocating channels in accordance with the present disclosure.

In one aspect of the present disclosure, the method 400 may be implemented in a network device that comprises a receiver configured to receive sensed information and requests for allocation of wireless channels and an apparatus, e.g., apparatus 300, for allocating wireless channels. For example, the method 400 may be implemented in an apparatus 300 wherein the aggregating is performed by aggregator 310, the analyzing of the aggregated sensed information and the determining when an incumbent is not detected is performed by analyzer 320, and the channel allocating is performed by channel allocator 330. In another example, the method 400 may be implemented in a device 500, described below.

The method 400 starts in step 405 and proceeds to step 410.

In step 410, the method aggregates, by an aggregator 310, sensed information received from a plurality of sensing devices.

In step 420, the method, by the analyzer 320, analyzes the sensed information that is aggregated and determines when an incumbent is not detected based on the analysis.

In step 430, the method, allocates, by the channel allocator 330, wireless channels of a targeted frequency spectrum to a user equipment when the incumbent is not detected. Steps 410-430 are executed to assign each channel of the targeted frequency to a UE based on priority, when an incumbent is not detected. The method may then proceed to step 440 to end the channel allocation or to step 410 to receive more sensed information.

Figure 5:
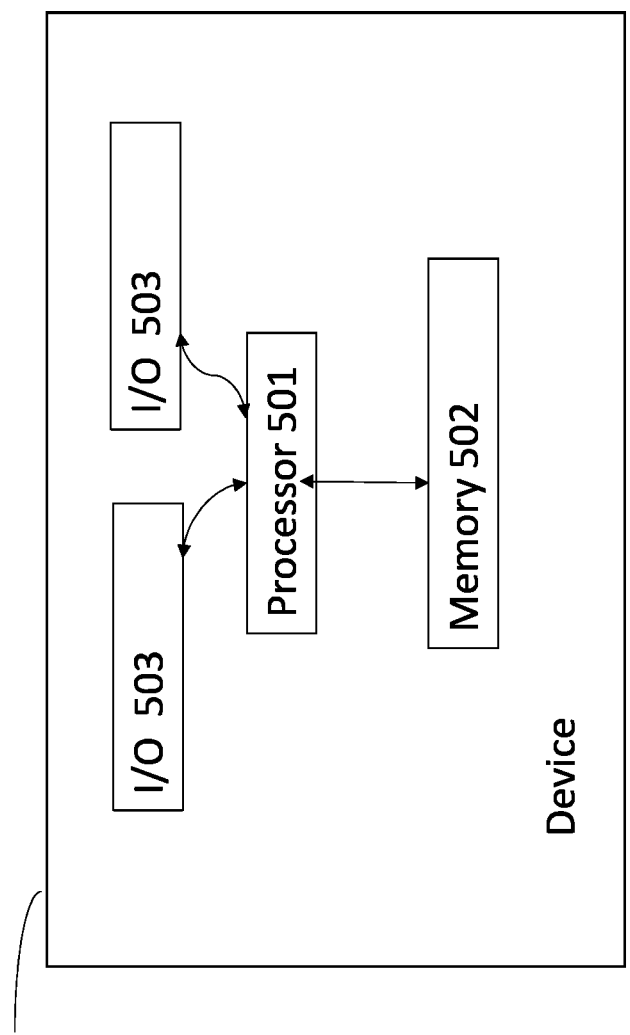
FIG. 5 illustrates a device for performing the functions described in the present disclosure.

FIG. 5 illustrates a device 500 for performing the functions described in the present disclosure. The device 500 comprises a processor 501 and a memory 502 configured to store a program instructions to be executed by the processor 501, where executing the program instructions causes the processor 501 to perform operations for allocating wireless channels, the operations comprising, the aggregating, analyzing, and channel allocating when an incumbent is not detected. The device 500 may further comprise any number and type of input/output devices 503.

It is noted that although FIG. 4 illustrates a single device, the method 400 may be implemented via any number of devices performing the operations of method 400 in a distributed manner, serial manner, or a combination thereof. In addition, the devices may be virtualized devices instantiated on servers (e.g., servers of a cloud network). As such, the representation of the hardware components of the device may be a virtualized or a physical representation, without departing from the teaching of the present disclosure. Accordingly, the method 400 may be implemented in hardware, software, or a combination thereof. It is noted that the processor 501 executing the program instructions includes the processor 501 performing the operations of the method 400 directly or indirectly. For example, the processor 501 may perform the operations in conjunction with other devices or may direct another device to perform the operations.

It should be understood that the aspects of the present disclosure are described above by way of examples. However, the various aspects are exemplary and not limitations. Thus, the scope of the present disclosure should not be construed as being limited by any of the above aspects or examples. The breadth and the scope of the present disclosure should be defined in accordance with the scope and breadth of the following claims and/or equivalents.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The following examples pertain to further embodiments.

Example 1 is an apparatus for allocating wireless channels of a targeted frequency spectrum, the apparatus comprising: an aggregator configured to aggregate sensed information received from a plurality of sensing devices; an analyzer configured to analyze the sensed information that is aggregated and to detect an incumbent based on the analysis; and a channel allocator configured to allocate a wireless channel of the targeted frequency spectrum to a user equipment based on the detection of the incumbent.

In Example 2, the subject matter of Example 1, being a spectrum access apparatus.

In Example 3, the subject matter of Example 1, wherein the allocating of the wireless channel to the user equipment is performed when the incumbent is not detected.

In Example 4, the subject matter of Example 1, wherein the sensed information available to an individual sensing device or an individual base station is inadequate for making a reliable decision as to detecting the incumbent.

In Example 5, the subject matter of Example 1, wherein the sensed information received from a respective sensing device of the plurality of sensing devices comprises first information, the first information being a decision, by the respective sensing device, as to a presence or an absence of the incumbent.

In Example 6, the subject matter of Example 5, wherein a threshold for the decision as to the presence or the absence of the incumbent by the respective sensing device is set to a noise floor level when the incumbent is inactive.

In Example 7, the subject matter of Example 5, wherein the decision, by the respective sensing device, is based at least in part on an energy level, wherein the energy level is sensed for the targeted frequency spectrum.

In Example 8, the subject matter of Example 5, wherein the sensed information received from a respective sensing device of the plurality of sensing devices further comprises second information, the second information being derived based on information known to the apparatus.

In Example 9, the subject matter of Example 8, wherein the information based on which the second information is derived is unknown to commercial modems and base stations.

In Example 10, the subject matter of Example 8, wherein the second information comprises an artificial noise sequence generated by a random sequence generator, wherein a spectral density of a power associated with the artificial noise sequence is higher than a spectral density of a power of an energy level that is sensed by the respective sensing device.

In Example 11, the subject matter of Example 8, the first information and the second information being combined by at least one of: adding the first information and the second information, interleaving the first information and the second information, and mixing the second information with the first information.

In Example 12, the subject matter of Example 1, wherein the sensed information received from the respective sensing device of the plurality of sensing devices comprises information about a quality of a link between the respective sensing device and a citizens broadband service device through which the respective sensing device communicates with the apparatus.

In Example 13, the subject matter of Example 12, the information about the quality of the link comprising: a packet error rate, a bit error rate, a signal-to-interference-plus-noise ratio, and/or an out-of-band radiation level.

In Example 14, the subject matter of Example 1, the sensed information is received from a sensing device of the plurality of sensing devices as a response to a respective request sent to the sensing device.

In Example 15, the subject matter of Example 14, wherein the plurality of sensing devices are selected from among sensing devices attached to a citizens broadband service device.

In Example 16, the subject matter of Example 14, wherein the respective request sent to the sensing device comprises the targeted frequency spectrum for which an energy level is to be sensed.

In Example 17, the subject matter of Example 14, wherein the respective request sent to the sensing device comprises a band of the targeted frequency spectrum for which an energy level is to be sensed, wherein requests sent to different sensing devices of the plurality of sensing devices are for different bands of the targeted frequency spectrum.

In Example 18, the subject matter of Example 1, wherein the aggregator is configured to aggregate the sensed information when a number of responses received from the plurality of sensing devices reaches or exceeds a predetermined threshold for a minimum number of responses received from the plurality of sensing devices.

In Example 19, the subject matter of Example 1, wherein the channel allocator is configured to: receive requests for an allocation of the wireless channel from one or more user equipment; identify the user equipment to which the wireless channel is to be allocated, wherein the user equipment is identified from among the one or more user equipment from which the requests for the allocation are received, wherein the user equipment that is identified comprises a device from which a request having a highest priority is received; and allocate the wireless channel to the user equipment that is identified when the incumbent is not detected.

Example 20 is a wireless device, comprising: a receiver configured to receive sensed information from the plurality of sensing devices and requests for allocation of wireless channels from user equipment; and the apparatus for allocating the wireless channels of the subject matter of Example 1, wherein the apparatus is configured to aggregate and analyze the sensed information to determine when an incumbent is not detected, and to allocate the wireless channels to user equipment when the incumbent is not detected.

In Example 21, the subject matter of Example 20, wherein the wireless device is a spectrum access system.

Example 22 is a method for allocating wireless channels of a targeted frequency spectrum, the method comprising: aggregating, by an aggregator, sensed information received from a plurality of sensing devices; analyzing, by an analyzer, the sensed information that is aggregated and detecting an incumbent based on the analysis; and allocating, by a channel allocator, a wireless channel of the targeted frequency spectrum to a user equipment based on the detection of the incumbent.

In Example 23, the subject matter of Example 22, wherein the allocating the wireless channel comprises: receiving requests for an allocation of the wireless channel from one or more user equipment; and identifying the user equipment to which the wireless channel is to be allocated, wherein the user equipment is identified from among the one or more user equipment from which the requests for the allocation are received, wherein the user equipment that is identified comprises a device from which a request having a highest priority is received; and allocating the wireless channel to the user equipment that is identified when the incumbent is not detected.

Example 24 is a device comprising: a processor; and a memory configured to store a program instructions to be executed by the processor, where executing the program instructions causes the processor to perform operations for allocating wireless channels of a targeted frequency spectrum, the operations comprising: aggregating sensed information received from a plurality of sensing devices; analyzing the sensed information that is aggregated and detecting an incumbent based on the analysis; and allocating a wireless channel of the targeted frequency spectrum to a user equipment based on the detection of the incumbent.

In Example 25, the subject matter of Example 24, wherein the allocating the wireless channel comprises: receiving requests for an allocation of the wireless channel from one or more user equipment; and identifying the user equipment to which the wireless channel is to be allocated, wherein the user equipment is identified from among the one or more user equipment from which the requests for the allocation are received, wherein the user equipment that is identified comprises a device from which a request having a highest priority is received; and allocating the wireless channel to the user equipment that is identified when the incumbent is not detected.

Example 26 is an apparatus for allocating wireless channels of a targeted frequency spectrum, the apparatus comprising: an aggregating means for aggregating sensed information received from a plurality of sensing devices; an analyzing means for analyzing the sensed information that is aggregated and to detect an incumbent based on the analysis; and a channel allocating means for allocating a wireless channel of the targeted frequency spectrum to a user equipment based on the detection of the incumbent.

In Example 27, the subject matter of Example 26, being a spectrum access apparatus.

In Example 28, the subject matter of Example 26, wherein the allocating of the wireless channel to the user equipment is performed when the incumbent is not detected.

In Example 29, the subject matter of Example 26, wherein the sensed information available to an individual sensing device or an individual base station is inadequate for making a reliable decision as to detecting the incumbent.

In Example 30, the subject matter of Example 26, wherein the sensed information received from a respective sensing device of the plurality of sensing devices comprises first information, the first information being a decision, by the respective sensing device, as to a presence or an absence of the incumbent.

In Example 31, the subject matter of Example 30, wherein a threshold for the decision as to the presence or the absence of the incumbent by the respective sensing device is set to a noise floor level when the incumbent is inactive.

In Example 32, the subject matter of Example 30, wherein the decision, by the respective sensing device, is based at least in part on an energy level, wherein the energy level is sensed for the targeted frequency spectrum.

In Example 33, the subject matter of Example 30, wherein the sensed information received from a respective sensing device of the plurality of sensing devices further comprises second information, the second information being derived based on information known to the apparatus.

In Example 34, the subject matter of Example 30, wherein the information based on which the second information is derived is unknown to commercial modems and base stations.

In Example 35, the subject matter of Example 30, wherein the second information comprises an artificial noise sequence generated by a random sequence generator, wherein a spectral density of a power associated with the artificial noise sequence is higher than a spectral density of a power of an energy level that is sensed by the respective sensing device.

In Example 36, the subject matter of Example 30, the first information and the second information being combined by at least one of: adding the first information and the second information, interleaving the first information and the second information, and mixing the second information with the first information.

In Example 37, the subject matter of Example 26, wherein the sensed information received from the respective sensing device of the plurality of sensing devices comprises information about a quality of a link between the respective sensing device and a citizens broadband service device through which the respective sensing device communicates with the apparatus.

In Example 38, the subject matter of Example 37, the information about the quality of the link comprising: a packet error rate, a bit error rate, a signal-to-interference-plus-noise ratio, and/or an out-of-band radiation level.

In Example 39, the subject matter of Example 26, wherein the sensed information is received from a sensing device of the plurality of sensing devices as a response to a respective request sent to the sensing device.

In Example 40, the subject matter of Example 39, wherein the plurality of sensing devices are selected from among sensing devices attached to a citizens broadband service device.

In Example 41, the subject matter of Example 39, wherein the respective request sent to the sensing device comprises the targeted frequency spectrum for which an energy level is to be sensed.

In Example 42, the subject matter of Example 39, wherein the respective request sent to the sensing device comprises a band of the targeted frequency spectrum for which an energy level is to be sensed, wherein requests sent to different sensing devices of the plurality of sensing devices are for different bands of the targeted frequency spectrum.

In Example 43, the subject matter of Example 26, wherein the aggregating means is for aggregating the sensed information when a number of responses received from the plurality of sensing devices reaches or exceeds a predetermined threshold for a minimum number of responses received from the plurality of sensing devices.

In Example 44, the subject matter of any of Examples 26-43, wherein the channel allocating means is for: receiving requests for an allocation of the wireless channel from one or more user equipment; identifying the user equipment to which the wireless channel is to be allocated, wherein the user equipment is identified from among the one or more user equipment from which the requests for the allocation are received, wherein the user equipment that is identified comprises a device from which a request having a highest priority is received; and allocating the wireless channel to the user equipment that is identified when the incumbent is not detected.

What is claimed is:

1. An apparatus, comprising:
aggregator processing circuitry configured to aggregate sensed information associated with a plurality of sensing devices in response to a presence of an incumbent when a number of responses received from the plurality of sensing devices reaches or exceeds a predetermined threshold number of responses, the sensed information including an artificial noise sequence, wherein a spectral density of a power associated with the artificial noise sequence is higher than a spectral density associated with an energy level that is sensed by one of the plurality of sensing devices; and
channel allocator processing circuitry configured to allocate a wireless channel of a targeted frequency spectrum to a user equipment based on the presence of the incumbent.

2. The apparatus of claim 1, wherein the artificial noise sequence is generated via a random noise generator.

3. The apparatus of claim 1, wherein the apparatus is associated with a spectrum access system (SAS).

4. The apparatus of claim 1, wherein the channel allocator processing circuitry is configured to allocate the wireless channel to the user equipment when the incumbent is not present.

5. The apparatus of claim 1, wherein a threshold for determining the presence of the incumbent is set to a noise floor level when the incumbent is inactive.

6. The apparatus of claim 1, wherein:
the sensed information is received from the one of the plurality of sensing devices in response to a request sent to the one of the plurality of sensing devices,
the plurality of sensing devices are selected from among sensing devices attached to a citizens broadband service device (CBSD), and
the request sent to the one of the plurality of sensing devices comprises the targeted frequency spectrum for which an energy level is to be sensed.

7. The apparatus of claim 6, wherein the request sent to the one of the plurality of sensing devices comprises a band of the targeted frequency spectrum for which an energy level is to be sensed, and
wherein requests sent to different sensing devices of the plurality of sensing devices are for different bands of the targeted frequency spectrum.

8. A device, comprising:
a receiver configured to receive sensed information from a plurality of sensing devices and requests for allocation of wireless channels from user equipment; and
processor circuitry configured to allocate the wireless channels, wherein the processor circuitry is configured to:
aggregate the sensed information associated with the plurality of sensing devices in response to a presence of an incumbent when a number of responses received from the plurality of sensing devices reaches or exceeds a predetermined threshold number of responses, the sensed information including an artificial noise sequence,
wherein a spectral density of a power associated with the artificial noise sequence is higher than a spectral density associated with an energy level that is sensed by one of the plurality of sensing devices; and
allocate a wireless channel of a targeted frequency spectrum to a user equipment based on the presence of the incumbent.

9. The device of claim 8, wherein the artificial noise sequence is generated via a random noise generator.

10. The device of claim 8, wherein the apparatus is associated with a spectrum access system (SAS).

11. The device of claim 8, wherein the processor circuitry is configured to allocate the wireless channel to the user equipment when the incumbent is not present.

12. The device of claim 8, wherein a threshold for determining the presence of the incumbent is set to a noise floor level when the incumbent is inactive.

13. The device of claim 8, wherein:
the sensed information is received from the one of the plurality of sensing devices in response to a request sent to the one of the plurality of sensing devices,
the plurality of sensing devices are selected from among sensing devices attached to a citizens broadband service device (CBSD),
the request sent to the one of the plurality of sensing devices comprises the targeted frequency spectrum for which an energy level is to be sensed,
the request sent to the one of the plurality of sensing devices comprises a band of the targeted frequency spectrum for which an energy level is to be sensed, and
requests sent to different sensing devices of the plurality of sensing devices are for different bands of the targeted frequency spectrum.

14. A method, comprising:
aggregating, by processing circuitry of a device, sensed information associated with a plurality of sensing devices in response to a presence of an incumbent when a number of responses received from the plurality of sensing devices reaches or exceeds a predetermined threshold number of responses, the sensed information including an artificial noise sequence,
wherein a spectral density of a power associated with the artificial noise sequence is higher than a spectral density associated with an energy level that is sensed by one of the plurality of sensing devices; and
allocating, by the processing circuitry of the device, a wireless channel of a targeted frequency spectrum to a user equipment based on the presence of the incumbent.

15. The method of claim 14, wherein the artificial noise sequence is generated via a random noise generator.

16. The method of claim 14, wherein the act of allocating the wireless channel to the user equipment is performed when the incumbent is not present.

17. The method of claim 14, further comprising:
setting a threshold for determining the presence of the incumbent to a noise floor level when the incumbent is inactive.

\* \* \* \* \*